United States Patent [19]

Alberts et al.

[11] Patent Number: 4,812,364
[45] Date of Patent: Mar. 14, 1989

[54] POLYETHER SILOXANE GRAFT POLYMERS

[75] Inventors: Heinrich Alberts, Odenthal; Hans-Bernd Alteweier, Leverkusen, both of Fed. Rep. of Germany

[73] Assignee: Bayer Aktiengesellschaft, Leverkusen, Fed. Rep. of Germany

[21] Appl. No.: 130,055

[22] Filed: Dec. 8, 1987

[30] Foreign Application Priority Data

Dec. 19, 1986 [DE] Fed. Rep. of Germany ....... 3643459

[51] Int. Cl.$^4$ ............................................. B32B 9/04
[52] U.S. Cl. ................................. 428/447; 427/387; 525/403; 525/404; 525/479
[58] Field of Search .............. 525/403, 404, 479; 427/387; 428/447

[56] References Cited

U.S. PATENT DOCUMENTS

| | | | |
|---|---|---|---|
| 3,342,766 | 9/1967 | Huntington | 524/859 |
| 4,259,474 | 3/1981 | Chakrabarti et al. | 525/403 |
| 4,737,552 | 4/1988 | Baney et al. | 525/479 |

Primary Examiner—Melvyn I. Marquis
Attorney, Agent, or Firm—Sprung Horn Kramer & Woods

[57] ABSTRACT

Novel graft copolymer comprising
(a) 0.1 to 99.9% by weight of polyalkylene oxide-organopolysiloxane block and/or comb polymer units and
(b) 99.1 to 0.1% by weight of units of polymerized perfluoroalkyl substituted allyl compounds, which graft polymers contain structural elements corresponding to the following general formula:

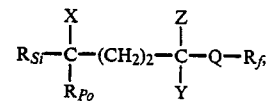

wherein

X denotes a hydrogen atom or a methyl group,

Y and Z denote, independently of one another, a hydrogen atom or an alkyl group containing 1 to 18 carbon atoms Q denotes a divalent alkylene group with 1 to 12 carbon atoms or other divalent radicals, $R_f$ denotes a perfluorinated aliphatic, optionally branched group with 1 to 20 carbon atoms and the group may contain at most one hydrogen or chlorine atom on two carbon atoms in addition to the fluorine atoms, $R_{Si}$ denotes a polyalkylene oxide-organopolysiloxane block and/or comb polymer residue and $R_{Po}$ denotes a polyalkylene oxide chain of the polyalkylene oxide-organopolysiloxane block and/or comb polymer, and in the graft polymers, more than 50% by weight of perfluoroalkyl substituted allyl monomers have been added in monomolecular form to the alkylene oxide units of the polyalkylene oxideorganopolysiloxane block and/or comb polymers, are useful as levelling agents for aqueous and/or solvent-containing lacquers and coating systems, for powder lacquers and for whirl sintering coating compounds.

10 Claims, No Drawings

POLYETHER SILOXANE GRAFT POLYMERS

This invention relates to new graft polymers, to a process for their preparation and to their use as levelling agents for aqueous, solvent-containing and pulverulent lacquers and coating systems.

Polyalkylene oxide organopolysiloxane block and comb polymers, hereinafter referred to as polyether siloxanes, are important auxiliary agents for a variety of technical applications by virtue of their interface activity (see W. Noll, Chemie und Technologie der Silicone, Verlag Chemie, Weinheim, 2nd Edition, 1968, pages 322-323 and 493-495).

In addition to their use as stabilizers for foams and as de-emulsifiers and antistatic agents for textiles, among others, such polymers are used in particular as auxiliary agents in aqueous or solvent-containing lacquers or coating systems.

U.S. Pat. No. 3,342,766 describes the use of polyalkylene oxide-organopolysiloxane block copolymers for the preparation of aqueous binder emulsions for spread coating, such as vinyl acetate or styrene -acrylate emulsions. Lacquers prepared on the basis of such emulsions containing polyether siloxanes have improved surface hardness and improved levelling flow when spread coated compared with lacquers which are free from polyether siloxanes.

In spite of the apparent qualitative advantages, this polymerization process has the disadvantage that the spread coating binders contain a certain quantity of levelling agent due to the starting materials from which they have been prepared, so that one is restricted in the formulations in which they can be employed. Levelling agents which impart the desired improvement in properties when added in only very small concentrations to the lacquer or coating compound provide more degrees of freedom to the user.

It is an object of this invention to provide effective auxiliary agents, in particular highly active levelling, cross-linking and smoothing agents for aqueous and solventcontaining lacquers or coating systems and powder lacquers and whirl sintering coating compounds which significantly improve the lacquer technical properties of the painting or coating compounds when used in very small concentrations.

This problem is solved by means of graft polymers of polyalkylene oxide-organopolysiloxane block and/or comb polymers and perfluoroalkyl-substituted allyl compounds.

The present invention relates to graft polymers composed of (a) 0.1 to 99.9% by weight of polyalkylene oxide-organo polysiloxane block and/or comb polymer units and (b) 99.1 to 0.1% by weight of units of polymerized perfluoroalkyl substituted allyl compounds, which graft polymers contain structural elements corresponding to the following general formula:

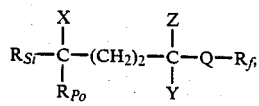

wherein

X denotes a hydrogen atom or a methyl group,

Y and Z denote, independently of one another, a hydrogen atom or an alkyl group containing 1 to 18 carbon atoms, Q denotes a divalent alkylene group with 1 to 12 carbon atoms, a divalent group corresponding to one of the following general formulae:

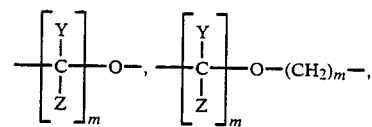

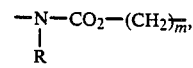

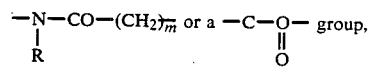

wherein

Y and Z have the meanings indicated above,

R denotes a hydrogen atom or an alkyl group with 1 to 18 carbon atoms and m represents an integer from 0 to 6, and $R_f$ denotes a perfluorinated aliphatic, optionally branched group with 1 to 20 carbon atoms and the group may contain at most one hydrogen or chlorine atom on two carbon atoms in addition to the fluorine atoms, and the perfluorinated aliphatic group may be interruped by oxygen atoms, $R_{Si}$ denotes a polyalkylene oxide-organopolysiloxane block and/or comb polymer residue and $R_{Po}$ denotes a polyalkylene oxide chain of the polyalkylene oxide-organopolysiloxane block and/or comb polymer, and in the graft polymers, more than 50% by weight of perfluoroalkyl substituted allyl monomers have been added in monomolecular form to the alkylene oxide units of the polyalkylene oxide organopolysiloxane block and/or comb polymers.

Graft polymers which contain from 35 to 95% by weight of polyalkylene oxide-organopolysiloxane block and/or comb polymer units and from 65 to 5% by weight of polymerized perfluoroalkyl substituted allyl compounds are preferred.

Graft polymers in which more than 70% by weight of perfluoroalkyl substituted allyl monomers are added in monomolecular form to the alkylene oxide units of the polyalkylene oxide-organopolysiloxane block and/or comb polymers are particularly preferred.

Graft polymers with the above mentnioned structural units in which the group $R_f$ is a perfluoroalkyl group of the formula $CF_3(CF_2)_n$ where n is an integer from 2 to 19 are also particularly preferred.

According to the present invention, the polyalkylene oxide-organopolysiloxane block and/or comb polymer units may have any composition and structure. A selection, which does not limit the invention, is described, for example, in W. Noll, Chemie und Technologie der Silicone, Verlag Chemie GmbH, Weinheim, 2nd Edition, 1968, pages 321 to 323, and in the literature references cited there.

According to this invention, the polymerized perfluoroalkyl-substituted allyl units are units corresponding to the following general formula

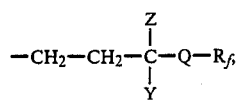

wherein the substituents Z, Y, Q and $R_f$ have the meanings indicated above.

Those units in which Q is a group of the formula

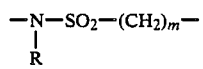

are preferred.

One particularly preferred unit has the following composition:

wherein n represents an integer from 3 to 19.

In the graft polymers according to the invention, the perfluoroalkylsubstituted allyl units are generally linked to a carbon atom which is in the α-position to oxygen atoms in the polyalkylene oxide chain of the polyalkylene oxide-organopolysiloxane block and/or comb polymer unts.

The graft polymers according to the invention are obtainable by radical polymerisation of perfluoroalkyl-substituted allyl compounds in the presence of polyalkylene oxide-organopolysiloxane block and/or comb polymers. It has been found that the allyl compound reacts virtually quantitatively in the radical polymerization reaction by a grafting reaction with the polyalkylene oxide chains of the polyalkylene oxide-organopolysiloxane block and/or comb polymers. It is surprising that this reaction is virtually quantitative since it is known that allyl compounds generally polymerize only incompletely and with difficulty (see G, Henrici-Olive, S. Olive, Verlag Chemie, Weinheim, 1969, page 69). Processes for the preparation of allyl copolymers by radical polymerization are known, for example from U.S. Pat. Nos. 2,894,938 and 2,940,946. The disadvantages of these processes are that the monomer conversions are too low, the consumption of radical former is too high and the molecular weights of the products obtained are very low.

It is surprisingly found that these disadvantages do not occur in the preparation of the graft polymers according to the invention.

This invention thus relates to a process for the preparation of the graft polymers according to the invention, characterized in that from 99.9 to 0.1% by weight of a perfluoroalkyl-substituted allyl monomer corresponding to the general formula

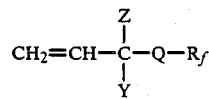

are polymerized in the presence of from 0.1 to 99.9% by weight of a polyalkylene oxide-organopolysiloxane block and/or comb polymer, the substituetns Z, Y, Q and Rf having the meanings indicated above.

In a preferred process for the preparation of the graft polymers according to this invention, 65 to 5% by weight of a perfluoroalkyl substituted allyl monomer of the above general formula are radically polymerized in the presence of 35 to 95% by weight of a polyalkylene oxide-organopolysiloxane block and/or comb polymer.

In one advantageous variation of the process according to the invention, radical polymerization is carried out in such a manner that more than 50% by weight of the perfluoroalkyl substituted allyl monomer is added in monomolecular form to the alkylene oxide units of the polyalkylene oxide-organopolysiloxane block and/or comb polymers.

Radical polymerization is preferably carried out in such a manner that more than 70% by weight of the perfluoroalkyl-substituted allyl monomers are added in monomolecular form to the alkylene oxide units or polyalkylene oxide-organopolysiloxane block and/or comb polymers.

This may be achieved by suitable choice of the reaction conditions, for example the reaction temperature or the concentration of radical former or the nature of the solvents.

The perfluoroalkyl substituted allyl compounds used for the preparation of the graft polymers according to this invention may be obtained, for example, by the processes described in GB-A-818 576, U.S. Pat. Nos. 2,519,983, 2,732,398, 3,704,311 and DE-A-2, 004 962.

It is particularly advantageous to use perfluoro-substituted allyl ether, allyl ester and N-allylsulphonamide derivatives for the process according to the invention, N-allylsulphonamide derivatives being preferred. From the group of N-allylsulphonamide derivatives, compounds which have the following composition:

wherein n stands for an integer of from 3 to 19 are particularly preferred.

The polyalkylene oxide-organopolysiloxane block and/or comb polymers used for the preparation of the graft polymers according to the invention may be obtained by conventional processes used in the art, e.g. as described in W. Noll, Chemie and Technologie der Silicone, Verlag Chemie, Weinheim, 2nd Edition, 1968, pages 321-323. For example, such polymers may be prepared by the reaction of organosiloxanes containing diacetoxy end groups as substituents with polyesters containing OH-terminated polyalkylene oxides or polyalkylene oxide blocks. The block and/or comb polymers may also be synthesized by the addition of allyl-terminated polyalkylene oxides or polyalkylene oxide derivatives to organopolysiloxanes containing Si—H groups. This addition is catalyzed in known manner, in most cases with platinum catalysts.

The radically initiated polymerization of the perfluoro-alkylene oxide-organopolysiloxane block and/or comb polymers may be started by means of radical formers, high energy radiation or heat. The radical formers are preferably azo and/or peroxide initiators used in quantities of the order of 0.05 to 15% by weight.

Examples of suitable radical formers are azo-diisobutyronitrile, azo-di-valeronitrile, their ester and iminoester derivatives, tert -butylperpivalate, tert -butylperoctoate, di-tert -butylperoxide and benzoyl peroxide. Other commonly used peroxidic or non-peroxidic radical formers may also be used, as, for example, phenyl-substituted ethane derivatives.

The radical polymerization may be carried out with or without the addition of solvents, in aqueous solution, in suspension or in emulsion. It is preferably carried out in solution, using hydrocarbons and fluorinated hydrocarbons as solvents.

The radical polymerization is preferably carried out at a temperature range of from 80° C. to 250° C. but it may be started and carried out at any temperature range, and one skilled in the art will be guided by the nature of the known or new initiator systems.

If desired, antioxidants based on phenol, diamine or phosphorus derivatives, UV absorbents, biocides and fillers of conventional type such as chalk, talc or silica, and inorganic and organic pigments, etc. may be introduced into the previously prepared graft polymer reaction mixture.

The graft polymers according to this invention are soluble or insoluble in water and solid or liquid at room temperature, depending on their composition. Many of the water-soluble graft polymers are surprisingly also soluble in solvents such as toluene, which opens up interesting possibilities of application for these products.

The present invention further relates to the use of the graft polymers according to the invention and the graft polymers obtainable by the process according to the invention as levelling agents for aqueous and/or solvent-containing lacquers and coating systems, for powder lacquers and for whirl sintering coating compounds. The graft polymers according to this invention significantly improve the levelling properties of the said lacquers and coating systems even when used in only very small concentrations.

They improve not only the levelling properties but also the bonding strength and scratch resistance of lacquers. When the graft polymers according to the invention are used as levelling agents in powder lacquers, it is advisable to add them to the formulation or at the stage of preparation of the powder lacquers.

The use of the graft polymers according to this invention in coating compounds and systems enables a wide variety of coatings to be advantageously applied to substrates such as paper, leather, textiles, metal and plastics.

The examples given below explain the preparation of the graft polymers according to this invention and their use as levelling agents in lacquers and coating systems.

The quantities given are to be understood as parts by weight or percentages by weight unless otherwise indicated.

The polyether siloxanes used for the examples are shown in Table 1 (the term "polyethersiloxane" is used here as synonymous with the polyalkylene-organopolysiloxane block and/or comb polymers). The individual examples and the quantities in which the components are used are shown in Table 2 and the viscosity and solubility in water and toluene of the graft polymers obtained acording to the examples are summarized in Table 3.

The graft polymers according to the invention are prepared according to the following general method of preparation:

The mixture of perfluoroalkyl-substituted allyl monomers and polyether siloxane indicated in the Examples (Table 2) is heated to 140° C. under nitrogen. The solution of peroxide in white spirit (boiling point 155°–185° C.) is added in the course of 2 hours. The reaction mixture is then stirred for 2 hours at 140° C. and for one hour at 150° C. The volatile constituents are then drawn off in a high vacuum at 150° C. The residue is cooled and then characterized as shown (Table 3).

TABLE 1

| Polyether siloxane No. | Schematic structure | |
| --- | --- | --- |
| 1 | $H_3C-\underset{\underset{CH_3}{|}}{\overset{\overset{CH_3}{|}}{Si}}-O-\left[\underset{\underset{CH_3}{|}}{\overset{\overset{CH_3}{|}}{Si}}-O\right]_n-\left[\underset{|}{\overset{\overset{CH_3}{|}}{Si}}-O\right]_m-\underset{\underset{CH_3}{|}}{\overset{\overset{CH_3}{|}}{Si}}-CH_3$ with $(OC_2H_4)_x-O-(CH_2)_3-CH_3$ side chain | n = 65, m = 3, x = 48 |
| 2 | $H_3C-\underset{\underset{CH_3}{|}}{\overset{\overset{CH_3}{|}}{Si}}-O-\left[\underset{\underset{CH_3}{|}}{\overset{\overset{CH_3}{|}}{Si}}-O\right]_n-\left[\underset{|}{\overset{\overset{CH_3}{|}}{Si}}-O\right]_m-\underset{\underset{CH_3}{|}}{\overset{\overset{CH_3}{|}}{Si}}-CH_3$ with $(CH_2)_3-(OC_2H_4)_{40}-OH$ side chain | n = 6, m = 24 |

TABLE 1-continued

| Polyether siloxane No. | Schematic structure | |
|---|---|---|
| 3 | $H_3C-\underset{\underset{CH_3}{|}}{\overset{\overset{CH_3}{|}}{Si}}-O-\left[\underset{\underset{CH_3}{|}}{\overset{\overset{CH_3}{|}}{Si}}-O\right]_n-\left[\underset{\underset{(CH_2)_3-O-(C_2H_4O)_x(C_3H_6O)_y-C(=O)CH_3}{|}}{\overset{\overset{CH_3}{|}}{Si}}-O\right]_m-\underset{\underset{CH_3}{|}}{\overset{\overset{CH_3}{|}}{Si}}-CH_3$ | n = 130<br>m = 15<br>x = 38<br>y = 12 |
| 4 | $H_3C-\underset{\underset{CH_3}{|}}{\overset{\overset{CH_3}{|}}{Si}}-O-\left[\underset{\underset{(CH_2)_3-(OC_3H_6)_{50}OH}{|}}{\overset{\overset{CH_3}{|}}{Si}}-O\right]_n-\left[\underset{\underset{CH_3}{|}}{\overset{\overset{CH_3}{|}}{Si}}-O\right]_m-\underset{\underset{CH_3}{|}}{\overset{\overset{CH_3}{|}}{Si}}-CH_3$ | n = 6<br>m = 24 |

TABLE 2

| Example No. | Polyether siloxane | | | | Perfluoroalkyl substituted allyl compound | | White spirit | di-tert.-butyl peroxide |
|---|---|---|---|---|---|---|---|---|
| | 1 | 2 | 3 | 4 | A | B | | |
| 1 | 200 | — | — | — | 50 | — | 100 | 5 |
| 2 | — | 200 | — | — | 50 | — | 100 | 5 |
| 3 | — | — | 200 | — | 50 | — | 100 | 5 |
| 4 | — | 100 | — | — | — | 200 | 200 | 10 |
| 5 | — | — | — | 200 | 50 | — | 100 | 5 | perfluoroalkyl substituted allyl compound
$CH_2=CH_2-NH-SO_2-(CF_2)_nCF_3$
A: n = 7
B: n = 3

TABLE 3

| Example No. | Viscosity at 23° C. (mPa.s) | Solubility in water | Solubility in toluene |
|---|---|---|---|
| 1 | 3200 | + | + |
| 2 | solid | + | + |
| 3 | 2500 | + | + |
| 4 | solid | (+) | + |
| 5 | 2780 | — | + |

+denotes soluble in water and toluene
(+) denotes low solubility
—denotes insoluble Examples of practical application of the graft polymers obtained according to the general method of preparation and characterized in Tables 2 and 3:

EXAMPLE 1

Use as levelling agent in a water-dilutable polyester-Alkydal lacquer (Alkydal R 35 W ® (Trade product of Bayer AG Leverkusen):

A 10% aqueous solution of the graft polymers prepared according to Examples 1, 2 and 3 is mixed with the polyester Alkydal lacquer at various concentrations. This lacquer is used for lacquering a steel sheet which has been soiled with engine oil.

The lacquer film moist with water is stoved at 130° C. for 20 minutes.

The lacquer coats obtained are compared with corresponding lacquer coats obtained with the aid of conventional commercial lacquer additives based on low molecular weight n-butylacrylate copolymers (for example, Modaflow ®, Mosanto, USA) and without the graft polymers according to the invention. The levelling properties and the surface structure of the lacquer coats are assessed, the surface structure being judged on the basis of the appearance of so-called craters and/or the so-called orange peel effect. The orange peel effect (the surface of the lacquer coat resembles the structure of an orange peel), and the occurrence of craters (crater shaped structures on the surface of the lacquer coat) are surface defects of lacquering.

No coherent lacquer coats can be obtained without levelling agents. When commercial levelling agents based on low molecular weight n-butylacrylate copolymers are used, from 0.3 to 0.5% by weight are required to ensure the formation of a smooth lacquer coat without craters.

When the graft polymers according to this invention are used, coherent lacquer coats free from craters and without an orange peel effect are obtained with only 0.04% by weight of the graft polymers from Examples 1, 2 and 3 in the lacquer.

EXAMPLE 2

Use as levelling agent for UV-curing solvent lacquers based on bis-acrylate modified polyester resins:

As an example of a UV-curing solution lacquer based on bis-acrylate modified polyester resins, a so-called high solid clear lacquer having a solids content of 72% by weight, of the type Baryoflex ®, Trade product of Chem. Fabrik Aarberg/Switzerland, was treated with 0.04% by weight of the graft polymers of Examples 4 and 5 according to the invention. This lacquer was used for varnishing venner woods and cured by UV radiation. A similar lacquer but free from levelling agent was used for comparison.

Without the addition of the levelling agent according to the invention, the lacquer obtained after curing showed the orange peel effect, which is an indication of less than perfect levelling. When the graft polymers according to the invention are added, excellent levelling flow of the lacquer without orange peel effect is obtained, in other words a perfect lacquer coat, and the bond strength and scratch resistance of the lacquer coat are also improved.

EXAMPLE 3

Use as levelling agent for powder lacquer coatings:

An ethylene-vinyl alcohol copolymer obtained by the saponification of an ethylene-vinyl acetate copolymer with 32% by weight of vinyl acetate and having a particle size of less than 100 μ was used as powder lacquer.

The graft polymer according to the invention described in Example 3 was added in varying quantities to this powder.

The powder was sprayed electrostatically on steel sheets measuring 10×10 cm and 1 mm in thickness, and the coated steel sheets were after-heated in a heating cupboard at 200° C. for 10 minutes. The electrostatic powder application was carried out in a conventional commercial plant at a voltage of −30 kV and with an air supply of 3.5 bar.

The same powder lacquer but without the addition of levelling agent and a powder lacquer containing conventional levelling agents based on low molecular weight n-butylacrylate copolymers were sprayed as described above for comparison.

Powder lacquers containing the graft polymers according to this invention provide excellent levelling flow free from craters even over the edges of the steel sheets when present in amounts of only 0.03% by weight of the graft polymer. The average thickness of layer obtained in 80 μ.

No coating free from craters is obtained without levelling agent. When levelling agents based on low molecular weight n-butylacrylate copolymers are used, satisfactory levelling flow free from the formation of craters is obtained only when at least 0.5% by weight, based on the ethylene-vinyl alcohol copolymer, is added.

It will be understood that the specification and examples are illustrative but not limitative of the present invention and that other embodiments within the spirit and scope of the invention will suggest themselves to those skilled in the art.

What is claimed is:

1. A graft comprising
   (a) 0.1 to 99.9% by weight of polyalkylene oxide-organo-polysiloxane block and/or comb polymer units and
   (b) 99.9 to 0.1 % by weight of units of a polymerized perfluoroalkyl substituted allyl compound, which graft polymer contains structural elements of the formula

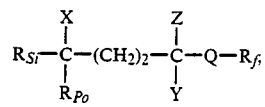

wherein

X denotes a hydrogen atom or a methyl group,

Y and Z denote, independently of one another, a hydrogen atom or an alkyl group containing 1 to 18 carbon atoms, Q denotes a divalent alkylene group containing 1 to 12 carbon atoms, a divalent group of the formula

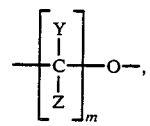

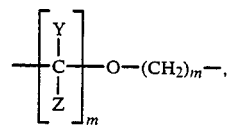

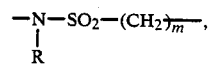

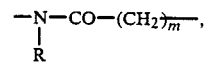

or a group of the formula

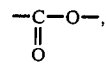

wherein

R denotes a hydrogen atom or an alkyl group containing 1 to 18 carbon atoms, and m denotes an integer from 0 to 6, $R_f$ denotes a perfluorinated aliphatic group containing 1 to 20 carbon atoms, which group may contain at the most one hydrogen or one chlorine atom on two carbon atoms in addition to the fluorine atoms, or a perfluoroalkyl polyether group, $R_{Si}$ denotes the radical of a polyalkylene oxide-organopolysiloxane block and/or comb polymer, $R_{Po}$ denotes a polyalkylene oxide chain of the polyalkylene oxide-organopolysiloxane black and/or comb polymer, in the graft polymers more than 50 % by weight of perfluoroalkyl-substituted allyl monomers being fixed as monomolecular units to the alkylene oxide units of the polyalkylene oxide-organpolysiloxane block and/or comb polymers.

2. A graft polymer according to claim 1, wherein the polyalkylene oxide-organopoly-siloxane block and/or comb polymer units are present in 35 to 95 % by weight and the units of polymerized perfluoroalkyl-substituted allyl compounds are present in 65 to 5 % by weight.

3. A graft polymer according to claim 1, wherein more than 70 % by weight of perfluoroalkyl substituted allyl monomers are fixed as monomolecular units to the alkylene oxide units of the polyalkylene oxide-organopolysiloxane block and/or comb polymers.

4. A graft polymer according to claim 1, wherein $R_f$ denotes a perfluoroalkyl group of the formula $CF_3(C_2)_n$— wherein n denotes an integer with a value from 2 to 19.

5. A process for the preparation of a graft polymer according to claim 1 comprising radical polymerizing from 99.9 to 0.1 % by weight of a perfluoroalkyl-substituted allyl monomer of the formula

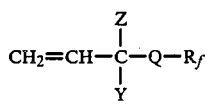

with from 0.1 to 99.9 % by weight of a polyalkylene oxide- organo-polysiloxane block and/or comb polymer.

6. A process according to claim 5, wherein 65 to 5% by weight of the perfluoroalkyl-substituted allyl monomer is polymerized with 35 to 95 % by weight of the polyalkylene oxide-organopolysiloxane block and/or comb polymer.

7. A process according to claim 5, wherein more than 50% by weight of the perfluoroalkyl substituted allyl monomer is added in monomolecular form to the alkylene oxide units of the polyalkylene oxide-organopolysiloxane block and/or comb polymer.

8. A process according to claim 5, wherein more than 70% by weight of the perfluoroalkyl substituted allyl monomer is added in monomolecular form to the alkylene oxide units of the polyalkylene oxide-organopolysiloxane block and/or comb polymer.

9. In a lacquer or coating composition comprising a coating agent and a levelling agent, the improvement which comprises employing as said levelling agent a graft copolymer according to claim 1.

10. In the coating of a substrate with a lacquer or coating composition containing a levelling agent, the improvement wherein said levelling agent comprises a graft copolymer according to claim 1.

* * * * *